United States Patent [19]
El-Sadi et al.

[11] Patent Number: 6,100,656
[45] Date of Patent: Aug. 8, 2000

[54] START-UP ALGORITHM FOR A BRUSHLESS SENSORLESS MOTOR

[75] Inventors: Ashraf I. El-Sadi, Union City; Bruce R. Peterson; Don Rowe, both of San Jose, all of Calif.

[73] Assignee: Quantum Corporation, Milpitas, Calif.

[21] Appl. No.: 09/234,046

[22] Filed: Jan. 19, 1999

[51] Int. Cl.$^7$ .................................................. H02K 23/00
[52] U.S. Cl. .......................................... 318/254; 318/439
[58] Field of Search .................................. 318/254, 439, 318/138, 430, 431

[56] References Cited

U.S. PATENT DOCUMENTS

| | | | |
|---|---|---|---|
| 4,874,993 | 10/1989 | Tanaka et al. | 318/254 |
| 5,003,242 | 3/1991 | Liber | 318/778 |
| 5,028,852 | 7/1991 | Dunfield | 318/254 |
| 5,191,270 | 3/1993 | McCormack | 318/254 |
| 5,343,127 | 8/1994 | Maiocchi | 318/254 |
| 5,530,326 | 6/1996 | Galvin et al. | 318/254 |
| 5,569,990 | 10/1996 | Dunfield | 318/254 |
| 5,723,967 | 3/1998 | Hongo et al. | 318/254 |
| 5,841,252 | 11/1998 | Dunfield | 318/254 |

*Primary Examiner*—David Martin
*Attorney, Agent, or Firm*—John C. Chen

[57] ABSTRACT

A start-up routine for a brushless sensor-less DC motor inductively measures motor position angle rather than motor start phase and inductively calculates an acceleration trajectory based on motor position rather than motor parameters. Motor position angle is determined by measuring the rise time of each phase, computing sinusoidal components for each phase, then calculating the angular position based on the sinusoidal components. The acceleration trajectory is determined by computing time delays for each phase. To do this, angular acceleration of the motor is calculated by determining the change in angular position of the motor between two predetermined time intervals. The motor may then be spun up with a start-up routine that is not dependent on motor parameters, resulting in a more efficient and consistent performance.

10 Claims, 4 Drawing Sheets

START-UP ALGORITHM FOR A BRUSHLESS SENSORLESS MOTOR

BACKGROUND OF THE INVENTION

The present invention relates generally to methods for use in disk drives for computer systems. More particularly, the present invention relates to methods for providing an inductive start-up control of a brushless DC spindle motor without the use of separate rotor position sensors.

BACKGROUND OF THE INVENTION

A typical brushless DC motor includes a fixed stator structure comprising one or more phase winding and a rotor structure typically including one or more permanent magnets providing fixed magnetic fields in close proximity to the stator structure. FIG. 1 shows a diagrammatic sectional plan view of a typical spindle motor having a stator with nine evenly distributed windings formed over a laminar stator core with nine gaps or slots. The rotor includes a radially polarized eight pole magnet. Rotor rotation results from direct current selectively switched to pass though the phase winding and the resulting electromagnetic fields induced by the windings interacting with the fixed fields of the rotor. The resulting interaction produces a rotary torque that causes the rotor to rotate relative to the stator.

In a disk drive application, a brushless polyphase DC motor is integrated with a spindle and hub assembly to rotate one or more data storage disks relative to read/write head. With the ever increasing speed and performance of current disk drives, a fast and efficient start-up sequence of the spindle motor is critical. A typical start-up sequence consists of the following steps:
1. motor position detection
2. Blind Acceleration
3. Back EMF feed back acceleration
4. Speed regulation There have been many prior approaches to detecting motor position, during start-up. Currently, the most commonly used techniques involve determining the rotor position by sensing the motor winding inductance. (For example, U.S. Pat. No. 5,530,326 to Galvin, entitled "Brushless DC Spindle Motor Start-up Control"). In a typical inductance sensing technique, each phase of the motor driver is excited in turn and the rise time of the current is measured in order to determine the inductance of each of the phase windings. Since the current rise time is proportional to the inductance of the windings, the controller typically selects the smallest inductance to be the phase that is aligned to the spindle, and energizes that phase first.

While this approach may be effective, there are limitations. First, there is a 30 electrical degree uncertainty in the rotor position since the controller only determines rotor position based on quadrant location. Secondly, current rise time readings are susceptible to errors due to asymmetrical circuitry in each phase. In addition, since this approach does not determine the rotor position relative to the equilibrium point, maximum torque cannot be created by the first phase that is energized. Lastly, the recent trend in designing high rpm spindle motors tends to reduce inductance. This makes it difficult for the disk drive controller to differentiate between rise time measurements.

During the acceleration phase of the start-up sequence, the spindle is typically accelerated open-loop according to a pre-calculated profile, based on motor parameters, up to a rotational velocity where the back-EMF (BEMF) amplitude provides reliable motor angular position feedback. A single acceleration profile is typically used for all drives. Thus, the time required to complete the acceleration depends on the optimization of the acceleration profile. Because of variations in motor parameters e.g. moment of inertia and torque constant, and the uncertainty in determining an accurate rotor position, a pre-calculated acceleration trajectory often leads to unpredictable blind acceleration times.

Thus, there exists a need for a faster and more efficient start-up sequence for a polyphase DC spindle motor that overcomes the limitations and drawbacks of the prior art.

SUMMARY OF THE INVENTION

The present invention satisfies these needs,

The present invention provides a method for starting up a brushless and sensor-less DC motor in a manner that overcomes the limitations and drawbacks of prior approaches. More specifically, the present invention provides a start-up sequence for use within conventional apparatus for commutating a polyphase brushless sensor-less DC spindle motor.

In accordance with principles of the present invention, the start-up algorithm senses an initial motor rotor position by first measuring a rise time for each commutation phase, then storing the rise time values in an array. The exact initial rotor angular position is then computed from the array, since the array is the discrete values of a periodic function of the rotor angular position. The start-up algorithm then moves the rotor by energizing the appropriate commutation phase. After motion is detected, an acceleration trajectory is computed adaptively by measuring the change in the rotor angular position in a given time interval at a given motor current. The acceleration trajectory is calculated in the form of an array of time delays and stored. The time delays are used to advance the motor commutation phases during blind acceleration.

Once the motor is spun up with the acceleration trajectory, to a predetermined angular velocity, conventional back-EMF techniques take over and control the commutation of the motor in a closed-loop.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which:

FIG. 1b is a simplified circuit diagram of the phase windings in the DC motor of FIG. 1a.

FIG. 2 is a schematic diagram of a Phase Lock Loop (PLL) controller electrically connected to the DC motor of FIG. 1a.

DETAILED DESCRIPTION OF THE EMBODIMENTS

The present invention will now be described in detail with reference to a few preferred embodiments thereof as illustrated in the accompanying drawings. In the following description, numerous specific details are set forth in order to provide a thorough understanding of the present invention. It will be obvious, however, to one skilled in the art, that the present invention may be practiced without some or all of these specific details. In other instances, well known structures and process steps have not been described in detail in order not to unnecessarily obscure the present invention.

Figure 1A:
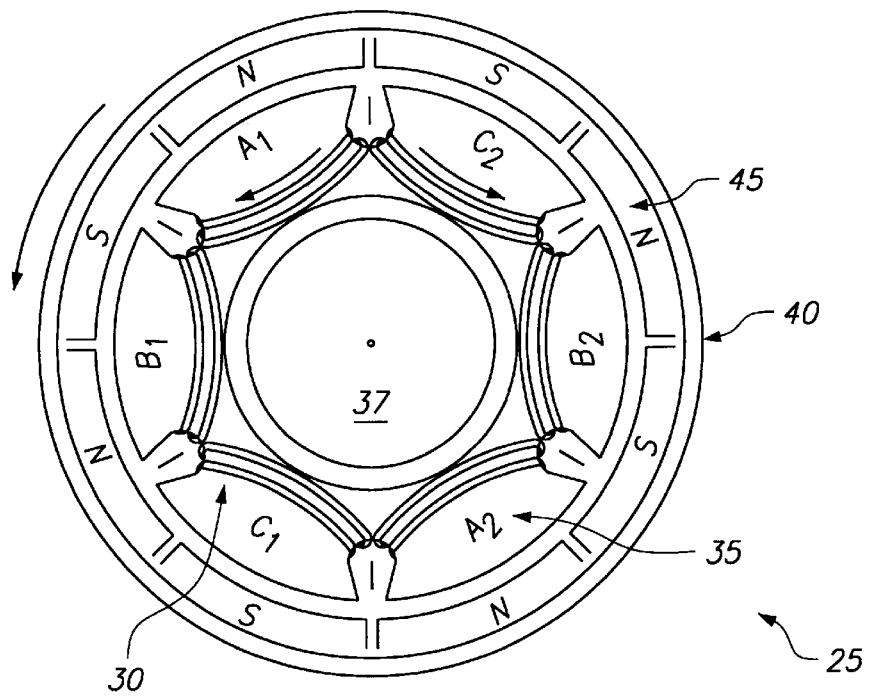
FIG. 1a is a diagrammatic plan view in section of a brushless DC motor of the prior art employing three phase windings.

FIG. 1a exemplifies a conventional brushless DC spindle motor of the type frequently used to rotate a disk spindle and storage disks in a hard disk drive. The motor 25 comprises 3 phase windings 30 arranged as a stator 35 and a rotor 40 comprising a ring shaped magnet 45. The phase windings 30 are positioned in a fixed shaft 37, and the rotor 40 is rotatably disposed about the shaft. The magnet 45 is shown with eight north (N) and south (S) poles magnetized therein alternatingly.

Figure 2:
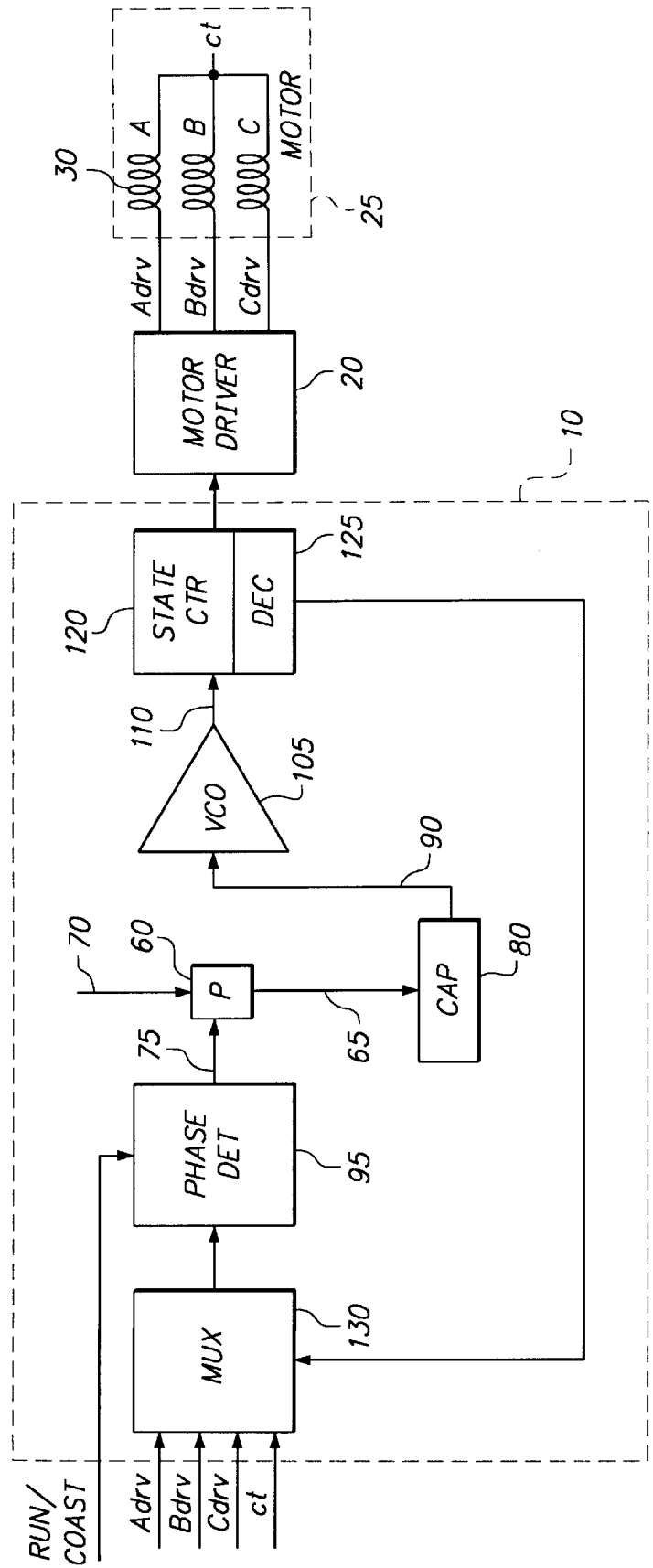

FIG. 2 shows a block diagram of a Phase Lock Loop (PLL) controller 10 electrically connected to a motor driver 20 which in turn is electrically connected to spindle motor 25. The PLL controller 10 provides a timing output signal to the motor driver 20 to optimally commutate the motor 25. The PLL controller 10 comprises a charge pump 60 for generating an output current at node 65 at one or more current levels in response to input control signals at nodes 70 and 75; a capacitor means 80 coupled to the charge pump 60 for receiving the output current from the charge pump 60 and generating a reference voltage at node 90 at a voltage level relative to the amount of charge stored in the capacitor means 80; a phase detector 95 electrically connected to the charge pump 60 and to the motor windings 30, detecting a rotational position of the rotor 40 relative to the windings 30, and generating a phase control signal at node 75 to cause the charge pump 60 to generate the output current at a current level as a function of the rotational position of the rotor 40; and a voltage control oscillator (VCO) 105 coupled to the capacitor means 80 for generating the timing output signal at node 110 at output frequencies as a function of the voltage level of said reference voltage at node 90. VCO output signal is coupled to a state counter 120 to generate three control signals, which are coupled to the motor driver 20 to commutate the windings 30. The control signals of the state counter 120 are coupled to a decoder-selector 125 to combine the winding waveforms wherein the decoder 125 provides selection signals to a multiplexer 130 to sequence the back emf voltages to the phase detector 95.

Figure 1B:
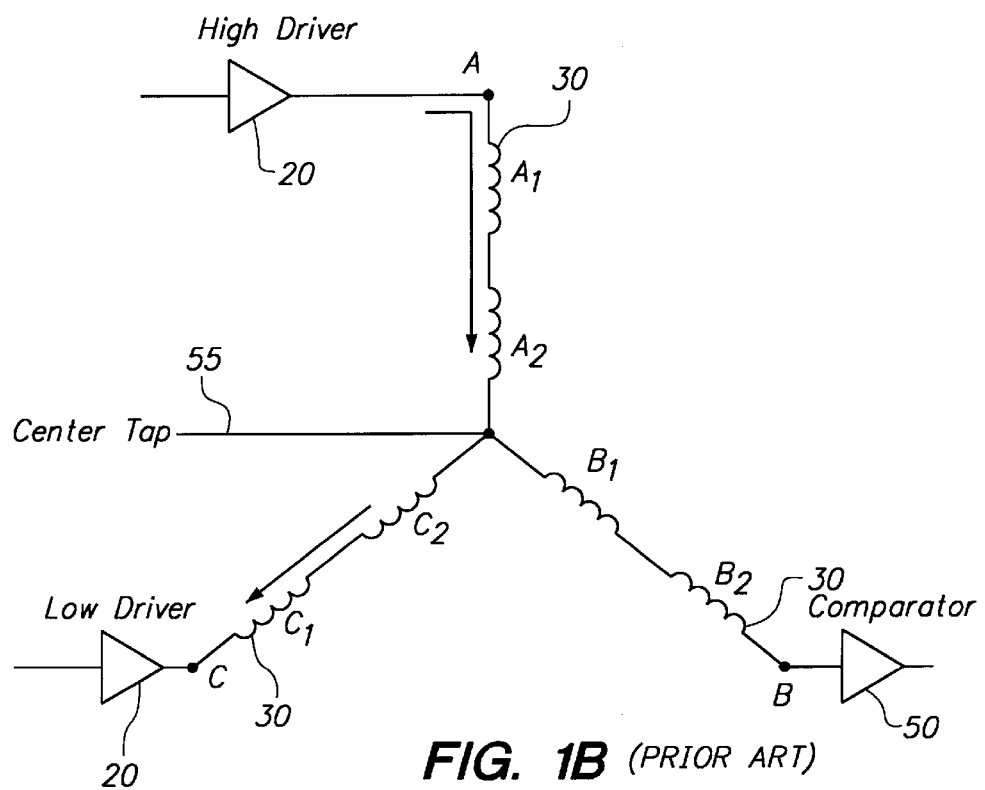

FIG. 1b shows a simplified circuit diagram of the phase windings 30 in the motor 25 designated as A, B and C. The spindle motor 25 is commutated by the motor driver 20 under timing output signals from the PLL controller 10, whereby the motor driver 20 applies currents to the phase windings 30 in sequential order to generate torque-inducing flux for moving the rotor 40. Each winding is electrically connected to a comparator 50 relative a center tap (ct) 55 to provide the back emf voltage of the windings 30 to the PLL controller 10.

Figure 4:
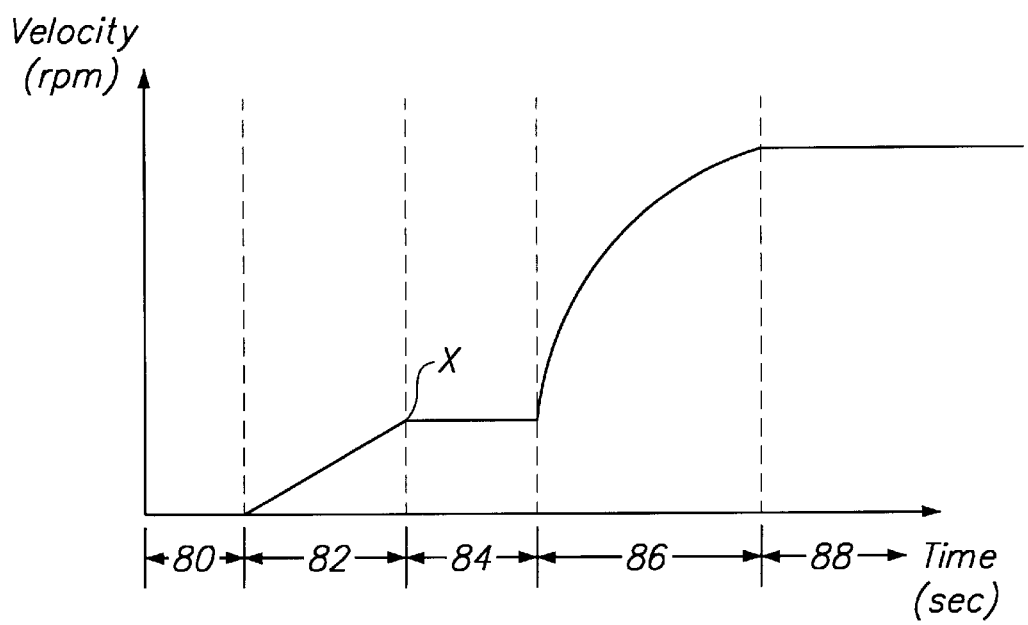
FIG. 4 is a graph of rotational velocity of the brushless DC spindle motor of FIG. 1a, illustrating the various stages of the start-up sequence.

FIG. 4 plots rotational velocity of the spindle motor 25 over time and illustrates five progressive, sequential modes 80, 82, 84, 86 and 88 which are implemented to control the spindle motor 25 in accordance with principles of the present invention. During the first mode 80, rotor angular position while the rotor is at rest, is determined. During the second mode 82, blind acceleration trajectory is determined so that the motor 25 can accelerate to a high enough speed to enable the PLL controller 10 to take over, denoted by X in FIG. 4.

Figure 3:
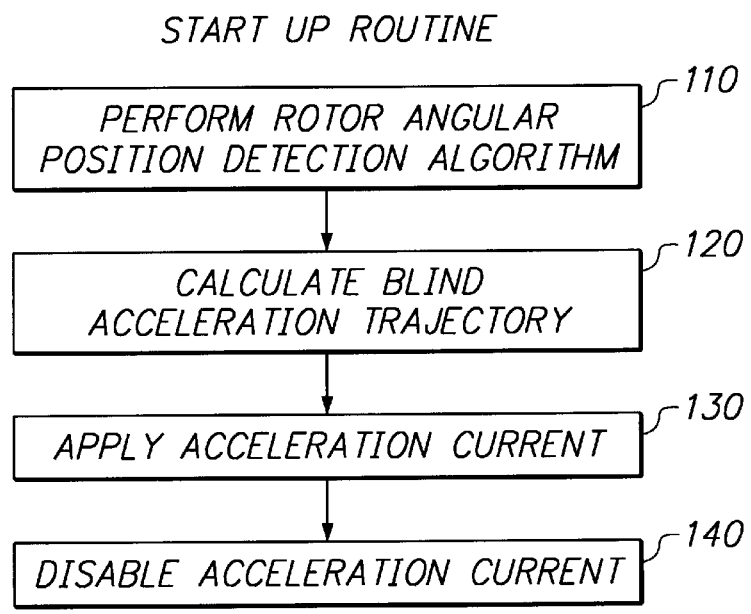
FIG. 3 is a flowchart illustrating an overall start-up sequence of the FIG. 2 apparatus in accordance with principles of the present invention.
Figure 5:
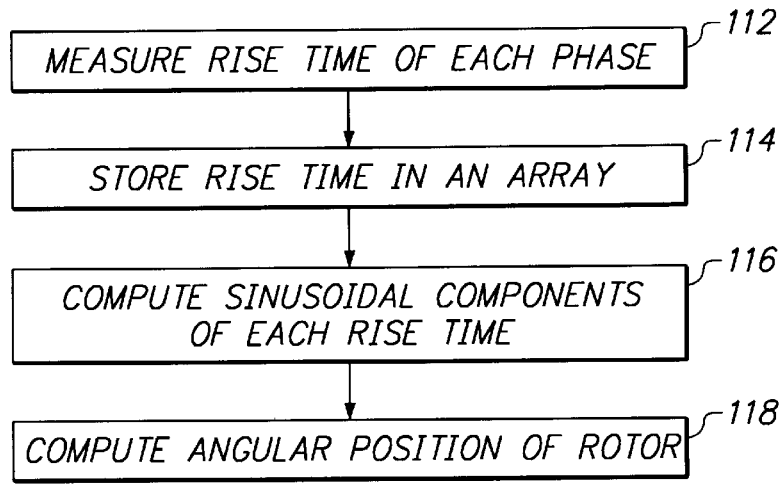
FIG. 5 is a flowchart of the inductive rotor sensing algorithm in accordance with principles of the present invention.
Figure 6:
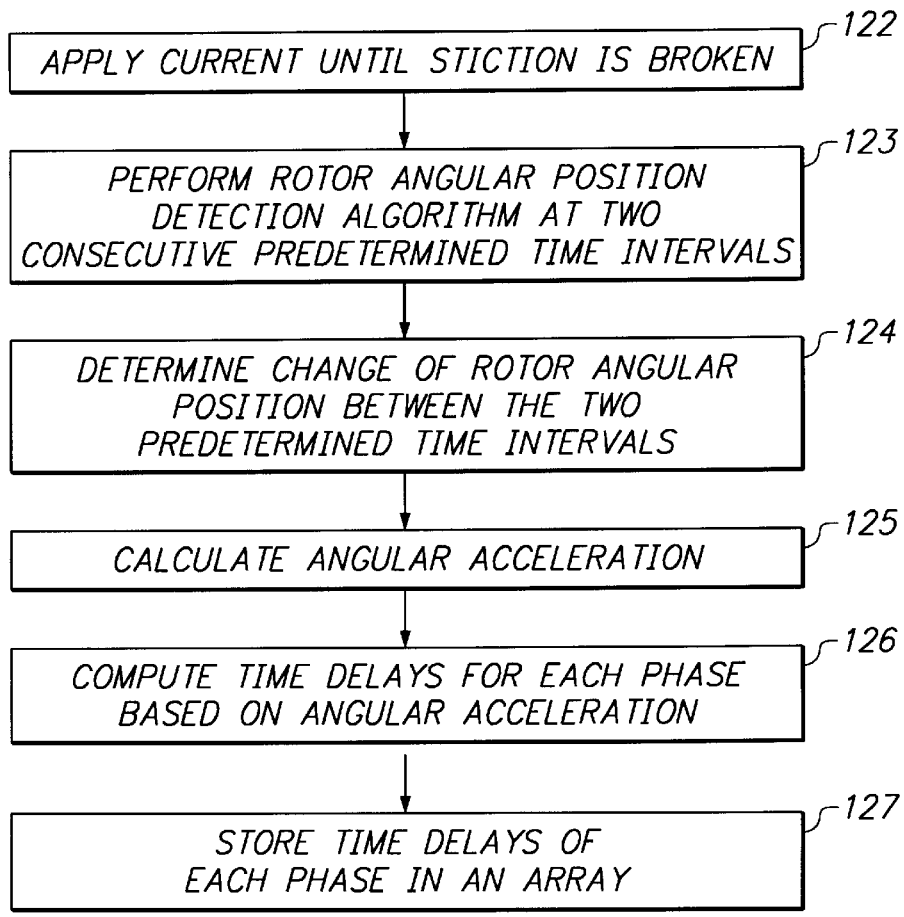
FIG. 6 is a flowchart of the algorithm for calculating the blind acceleration trajectory in accordance with principles of the present invention.

FIGS. 3, 5 and 6 represent the sequence of steps that the disk drive controller performs in starting the motor 25 during modes 80 and 82.

Starting with step 110, which represents mode 80, rotor angular position is detected as the disk drive controller measures the current rise time for each commutation state then calculates the rotor angular position from the rise time values. Rotor angular position may then be mathematically determined from the current rise time array as explained below.

In an n phase motor there are 2n commutation states. The 2n commutation states are achieved by energizing the current in the forward and reverse direction for every phase winding. To measure a commutation phase current rise time, the controller energizes current in the selected phase. And as soon as the current reaches the commanded level the motor driver automatically switches the current off to prevent any rotor movement. The motor driver indicates the phase current rise time via a current enable pulse. The controller measures a current enable pulse width, T, which is proportional to the commutation phase current rise time and linearly proportional to the inductance of the motor phase's winding as follows:

$$T = L/R \, Ln(1 - i\,R/V) + \Delta\tau \quad (1)$$

Where;

T=Measured pulse width.

L=Motor phase winding inductance.

R=Motor phase winding resistance.

i=Motor phase winding current.

V=Motor driver power supply voltage.

$\Delta\tau$=Controller processing and motor driver time delays.

When current is energized in a motor phase winding, a magnetic flux is generated. The total amount of flux can be increased or decreased by the amount of current, thus modifying the saturation level in the air gap. The flux density depends on the radial position of the winding with respect to the permanent magnet field. In an n phase motor, the n stator windings are preferably identical and spaced symmetrically around the permanent magnet field. For a 2-pole motor a complete cycle of rotation (360 mechanical degrees) can be achieved by sequentially energizing current in the forward and reverse direction of the n phase winding. For a 2m pole motor there are m complete cycles of electrical rotation (360 electrical degrees).

The flux density is a periodic function of the rotor electrical angular position. The winding inductance is defined as flux linkage per ampere. For non-saturated air gap the motor phase winding inductance has a periodic function dependence on the rotor electrical angular position.

For an n phase motor, when energizing current in the positive direction in phase I, the winding inductance can be represented as follows:

$$L_I(\text{Forward current}) = L_{f0} + \Delta L_f \, SIN(\Theta + 2\pi(I/n)) \quad (2)$$

Where;

$L_I$=Phase I winding total inductance.

$L_{I0}$=Phase I static inductance.

$\Delta L_I$=Phase I inductance due to flux linkage at air gap.

$\Theta$=Motor electrical angular position.

Using equation (1) the measured pulse width T of the (I) phase current rise time can be written as follows:

$$T_I(\text{Forward current})=T_{I0}+\Delta T_I \, \text{SIN}(\Theta+2\pi(I/n)) \quad (3)$$

Where

I=Phase winding (1,2, ... n)

$\Theta$=Rotor electrical angular position $2\pi(I/n)$=Phase winding I commutation angle When the current direction is reversed, the measured pulse width of the phase current rise time is:

$$T_I(\text{Reverse Current})=T_{I0}+\Delta T_I \, \text{SIN}(\Theta+2\pi(I/n)+\pi) \quad (4)$$

The sum in Equation (4) may be determined by multiplying the value of the rise time by the sine of its phase winding commutation angle:

$$T_I(\text{Forward current})\text{SIN}(2\pi(i/n))+T_I(\text{Reverse Current})\text{SIN}(2\pi(i/n)+\pi) = 2\Delta T_I[\text{SIN}(\Theta+2\pi(i/n))\text{SIN}(2\pi(i/n))]=\Delta T_I[\text{COS}(\Theta)-\text{COS}(\Theta+4\pi(i/n))]$$

Then repeat this operation on all phases and calculate the total sum. Assuming identical phase winding $\Delta T_1=\Delta T_2 \ldots =\Delta T_n=\Delta T$ $$\Sigma_{I=1 \, to \, n} \, T_I \text{SIN}(2\pi(I/n))=n\Delta T \, \text{COS}(\Theta)-[\Delta T\Sigma_{I=1 \, to \, n} \, \text{COS}(\Theta+4\pi(I/n))]$$

$\Delta T\Sigma_{I=1 \, to \, n} \, \text{COS}(\Theta+4\pi(I/n))$ reduces to zero, and the total sum equals:

$$\Sigma_{I=1 \, to \, n} \, T_I \, \text{SIN}(2\pi(I/n))=n\Delta T \, \text{COS}(\Theta) \quad (5)$$

Similarly, calculate the sum of the product of the measured pulse rise times multiplied by the cosine of its phase winding's commutation angle.

$$T_I(\text{Forward current})\text{COS}(2\pi(I/n))+T_I(\text{Reverse Current})\text{COS}(2\pi(I/n)+\pi) = 2\Delta T_I[\text{SIN}(\Theta+2\pi(I/n))\text{COS}(2\pi(I/n))]=\Delta T_I[\text{SIN}(\Theta)+\text{SIN}(\Theta+4\pi(I/n))]$$

$\Delta T\Sigma_{I=1 \, to \, n} \, \text{SIN}(\Theta+4\pi(I/n))$ will reduce to zero, and the total sum equals:

$$\Sigma_{I=1 \, to \, n} \, T_I \, \text{COS}(2\pi(I/n))=n\Delta T \, \text{SIN}(\Theta) \quad (6)$$

The rotor angular position $\Theta$ can thus be found by calculating the ARCTAN of the ratio of equations (6) to (5) or $$\Theta=\text{ARCTAN}[\Sigma_{I=1 \, to \, n}T_I \, \text{SIN}(2\pi(I/n))/\Sigma_{I=1 \, to \, n} \, T_I\text{COS}(2\pi(I/n))] \quad (7)$$

where $T_1$=rise time $(2\pi(I/n))$=commutation phase angle

For a 3 phase motor, n=3, the controller uses phase angles 120, 240 and 360 to calculate equations (5) and (6). Using Trigonometric function reduction it can be found that the controller needs only to perform one multiplication, one division and a look-up table to find the ARCTAN of the ratio.

After the controller calculates the rotor angular position it advances the commutation counter to the correct commutation state and applies current to start the motor.

The motor driver 20 relies on the BEMF feed back to sequence the commutation counter and thus accelerate the motor. As mentioned above, the BEMF feedback is not usable unless the motor is accelerated to a high enough rotational speed e.g., 200 rpm. A blind trajectory is required to accelerate the motor. In accordance with the principles of the present invention, an adaptive technique is be used to perform the blind acceleration phase.

Returning to FIG. 3, at step 120, the blind acceleration trajectory, represented in FIG. 4 as mode 82, is then determined in the steps outlined in the flow diagram of FIG. 6. In general, angular acceleration of the motor is constant and given by $$\Theta''=(K_t*I)/J \quad (8)$$

where $K_t$=motor torque constant

I=current

J=total moment of inertia of the motor and load

However, J typically varies from motor to motor. Therefore, using a $\Theta''$ based on one J value tends to produce an inconsistent acceleration trajectory and inefficient performance when the same value is used for all motors. Thus in accordance with principles of the present invention, $\Theta''$ is determined inductively, without reliance on motor specifications.

First, in step 122, current is applied to the motor until motion is detected, indicating that stiction has been broken. This may be determined through the rotor angular position detection algorithm, as described herein above. Then, in step 123, current is again applied to the motor for a predetermined time interval t. The rotor angular position is again determined in accordance with the rotor angular position algorithm at step 124. Steps 123 and 124 are repeated in steps 125 and 126 to determine a second rotor angular position after current is applied for the predetermined time interval t. The difference between the first and second angular positions represents the amount of rotor travel while under constant torque condition. Angular acceleration $\Theta''$ may then be calculated, in step 127 by the following relationship $$\theta'' = \frac{\Delta\theta}{t^2} \quad (9)$$

(9)

where t may be for example 0.1 sec and $\Delta\Theta$ is determined as in step 124.

Next, in step 126, the controller determines commutation time delays $\tau(n)$ for each phase, I, in accordance with the following relationship $$\tau(I) = \sqrt{\frac{\theta + (I-1)\phi}{\theta''}} \quad (10)$$

(10)

where $\Theta$ represents the rotor angular position as determined in accordance with the algorithm in step 110, $\phi$ represents the number of electrical degrees in each commutation phase and $\Theta''$ is angular acceleration as determined in Eq. (9). For example, a 3-phase, 12 pole DC motor would have 6 commutation cycles and 6 commutation phases, with each commutation phase being $\phi$=60 electrical degrees. The time delays for each phase are then stored in an array, as represented in step 127. The present method produces a more efficient and consistent acceleration trajetory because in part, as shown in Eq. (10), the exact initial rest position of the rotor, Θ, is factored into the time delay T(n). That is, as illustrated in FIG. 7, if the rotor is sensed to be positioned at point A, between optimum commutation points of flux Θ1 and Θ2, the time delay between Θ1 and point A is avoided during start-up. Optimum commutation points of flux are rotor angular positions that yield maximum torque and are the preferred points for switching between phases. Therefore, because the exact rotor position in known, motor start-up always occurs at an optimum commutation point. In addition, the present start-up algorithm produces a more efficient and consistent acceleration trajectory because the algorithm is not dependent on motor parameters.

Once the blind acceleration trajectory is determined, the motor is accelerated to a predetermined rotational speed, X in FIG. 4, by applying an acceleration current in step 130. The convergence of rotor position and the electrical commutation angle at point X may be determined by the controller by monitoring the sensed back-EMF induced in one undriven winding immediately before commutation switchover and by monitoring sensed back-EMF induced in the next undriven winding immediately following switchover. If these two voltages are the same, the electrical commutation angle has converged with the actual commutation angle (rotor position). However, if there is a sensed voltage difference at the commutation switchover point, a rotor phase lead or phase lag is present, determined by the sign of the difference.

At rotational velocity X, the acceleration current is switched off in step 140 as commutation control is switched from firmware to the phase locked loop during mode 84. The motor then accelerates through mode 86 to the nominal velocity at mode 88.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed:

1. A method of starting a polyphase brushless sensor-less motor comprising the steps of:

measuring a rise time of each phase;

determining commutation phase angles of the motor;

calculating an angular position of a rotor of the motor based on sinusoidal components of the commutation phase angles;

determining a time delay of each phase;

calculating an acceleration trajectory; and applying a commutation current to start rotation of the rotor.

2. The method of claim 1 further comprising the step of storing the rise time measured for each phase in a first array.

3. The method of claim 2 further comprising the step of storing the time delay for each phase in a second array.

4. The method of claim 1 wherein the step of determining the time delay of each phase further comprises the step of determining an angular acceleration of the motor.

5. The method of claim 4 wherein the step of determining the angular acceleration of the motor further comprises the steps of:

applying current to the motor until stiction is broken;

determining a reference angular position of the rotor;

applying current to the motor for a predetermined time interval;

determining a first angular position of the rotor;

applying current to the motor for the predetermined time interval;

determining a second angular position of the rotor; and determining a relative change in rotor angular position between the first and second angular rotor positions over the predetermined time interval.

6. In a disk drive including a rotatable data storage disk, an actuator assembly for positioning a transducer head proximate a surface of the disk and a controller for providing a starting sequence to a spindle motor, the starting sequence comprising the steps of:

measuring a rise time for each phase of the spindle motor;

determining commutation phase angles of the motor;

calculating an angular position of a rotor of the motor based on sinusoidal components of the commutation phase angles;

calculating an acceleration trajectory; and applying a current to start rotation of the rotor.

7. The starting sequence of claim 6 wherein the step of calculating the acceleration trajectory comprises the step of determining an angular acceleration of the motor.

8. The starting sequence of claim 7 wherein the step of determining the angular acceleration of the motor further comprises the steps of:

applying current to the motor until stiction is broken;

determining a reference angular position of the rotor;

applying current to the motor for a predetermined time interval;

determining a first angular position of the rotor;

applying current to the motor for the predetermined time interval;

determining a second angular position of the rotor; and determining a relative change in rotor angular position between the first and second angular rotor positions over the predetermined time interval.

9. A controller for providing a starting sequence to a polyphase brushless motor, the starting sequence comprising the following steps:

measuring a rise time for each phase of the spindle motor;

determining commutation phase angles of the motor;

calculating an angular position of a rotor of the motor based on sinusoidal components of the commutation phase angles;

calculating an acceleration trajectory; and applying a current to start rotation of the rotor.

10. The controller of claim 9 wherein the step of calculating the acceleration trajectory further comprises the step of calculating an angular acceleration of the motor based on a change of rotor angular position during a predetermined time interval.

* * * * *